United States Patent [19]

Tai et al.

[11] Patent Number: 4,556,950

[45] Date of Patent: Dec. 3, 1985

[54] INCOHERENT OPTICAL PROCESSOR

[75] Inventors: Anthony M. Tai, Plymouth; Carl C. Aleksoff, Ann Arbor, both of Mich.

[73] Assignee: Environmental Research Institute of Michigan, Ann Arbor, Mich.

[21] Appl. No.: 528,942

[22] Filed: Sep. 2, 1983

[51] Int. Cl.[4] .......................... G06G 9/00; G02B 5/18

[52] U.S. Cl. ................................ 364/827; 350/162.12; 350/162.2; 364/713

[58] Field of Search ............... 364/576, 713, 822, 827; 350/162.11, 161.12, 162.13, 162.14, 162.15, 162.16, 162.17, 162.19, 162.21

[56] References Cited

U.S. PATENT DOCUMENTS

| | | | |
|---|---|---|---|
| 4,082,431 | 4/1978 | Ward, III | 364/827 X |
| 4,286,328 | 8/1981 | Bocker | 364/822 X |
| 4,286,872 | 9/1981 | Schneider et al. | 364/822 X |
| 4,339,176 | 7/1982 | Lee | 364/822 X |
| 4,389,092 | 6/1983 | Tamura | 364/822 X |
| 4,514,038 | 4/1985 | Pichon et al. | 364/822 X |
| 4,514,059 | 4/1985 | McDonnell | 364/822 X |

OTHER PUBLICATIONS

Rogers: Non-Coherent Optical Processing Optics and Laser Technology, Aug. 1975, vol. 7, No. 4, pp. 153-162.

*Primary Examiner*—Felix D. Gruber
*Attorney, Agent, or Firm*—Krass & Young

[57] ABSTRACT

An optical signal processor operating on interferometric principles serves to perform real time Fourier transformations on the intensity distribution of one-dimensional incoherent input light sources.

7 Claims, 5 Drawing Figures

INCOHERENT OPTICAL PROCESSOR

TECHNICAL FIELD

This invention relates to optical signal processors and, more particularly, to incoherent optical signal processors for performing Fourier transformation analyses.

BACKGROUND ART

There exists a long felt need for a technique for performing Fourier transformation analysis of incoherent optical data in real time. In order to process the image of an object scene using conventional techniques, the image must first be received by a transducer and converted to an appropriate form. For electronic processing, the image data is converted into voltage variations and for coherent optical processing, it is converted into amplitude transmittance variations. This conversion step tends to limit the operating speed of the processing system. If a system is capable of processing incoherent optical data on the other hand, the conversion step is eliminated and the processing can be performed at the speed of light.

Fourier transformations can be performed electronically using a suitable computer and software. The processing by a computer is usually serial in nature and the processing speed is very limited. The use of an array processor increases the amount of parallelism and the processing speed. True real time (speed of light) processing, however, is still not possible with this approach. Coherent optical processors can perform the Fourier transformation in real time. To process the image of an incoherently illuminated object scene, however, requires an incoherent to coherent optical conversion using a spatial light modulator which limits the system throughput, reduces the dynamic range and introduces nonlinearity.

One dimensional processing using bulk acoustical modulators or SAW devices on the other hand are limited in the space-bandwidth product by physical constraints such as transducer frequency response, acoustical velocity and acoustical attenuation. Moreover, processing with acoustical modulators is limited to serial inputs. To be able to process parallel spatial inputs such as images, a spatial-to-temporal conversion is needed.

Incoherent optical processing techniques such as OTF synthesis permit the use of incoherent optical inputs but their applications are limited to a rather restrictive class of operations. Complex Fourier transformations, for example, has not been demonstrated. The optical vector-matrix multiplier operates on discrete sampled signals. The difficulties in constructing and aligning a large two-dimensional mask and the limits on the densities of these masks restrict the space-bandwidth product that can be practically achieved. The relative complexity of the system also diminishes its attractiveness.

This invention is based on the physical principle described by the well known Van-Cittert Zernike theorem. It states that a Fourier transformation relationship exists between the intensity distribution of a quasimonochromatic, spatially incoherent source and the mutual coherence function at far field. This relationship is the basis for the Michelson stellar interferometers. Thus, by measuring the mutual coherence function at far field (the far field condition can be satisfied with the use of a collimating lens), the complex Fourier transform of an incoherent optical input can be obtained. The problem is devising a practical means to measure and display the complex mutual coherence function in real time.

With the Michelson stellar interferometer and other similar interferometric imaging systems, the spatial frequencies are sampled by physically varying the separation of the detecting apertures. Such a sequential measurement scheme is too slow for use in a real time processing system. The requirements that the input be quasimonochromatic also makes the system very inefficient for inputs that are polychromatic.

The present invention is directed to solving one or more of these problems encountered with the systems utilizing prior art techniques.

SUMMARY OF THE INVENTION

Pursuant to the present invention, an optical processor is provided for directly performing complex Fourier transformations on the intensity distribution of a one-dimension incoherent input light source in real time. Incoherent light from the source to be analyzed is collimated and passed through a sinusoidal grating which diffracts the light into symmetric by opposite angles. The light interferes within an interference zone or a fringe box. The recombined beams are sheared by varying amounts along the axis perpendicular to the grating. The amount of shear is zero at the surface of the grating and increases as one moves away from the grating. As will be recognized by those familiar with the art, the complex fringe visibility along the axis perpendicular to its grating is the mutual coherence function of the input light field which in turn is equal to the Fourier transform of the intensity distribution of the incoherent source at far field.

In the preferred embodiment, a beam splitter recombines the light and the light field at the plane of the beam splitter is mapped onto an output plane with an imaging lens. The intensity distribution displayed at the output plane represents the cosine or sine transform of the input light intensity distribution.

In one embodiment, a complex Fourier transformation (which is equivalent to a simultaneous cosine and sine transformation) is performed by splitting the grating into two halves, one half of the grating is phase shifted 90 degrees with respect to the other half. In such manner, real and imaginary parts of the complex Fourier transform are simultaneously obtained. Suitable transducer means, such as a pair of photodetector arrays can be placed at the output plane and utilized to convert the displayed Fourier transform into electrical signals for further processing.

An alternative configuration for the optical processor permits an easier placement of the beam splitter that does not have to physically be in contact with the grating. The first grating splits the light into two beams, diffracting them into symmetric but opposite angles. The beams are intercepted by the second and third gratings, respectively. The second and third gratings have twice the spatial frequencies as the first grating. They operate to recombine the light and cause the two parts to interfere at a zone or fringe box. A pellicle beam splitter is placed at the center of the fringe box. Similar to the optical processor of the first embodiment, the light field along the beam splitter is mapped onto the output plane using an imaging lens. The cosine or sine transform of the input is displayed as the intensity distribution over a uniform bias at the output plane. To obtain the cosine and sine transform simultaneously, a split grating with a 90 degree phase shift between the halves is used as the second or third grating.

To avoid the mechanical stability of pellicle beam splitters, the beam splitter may be replaced by a tilted fourth grating which has the same spatial frequency as the first grating. The light field along the grating is mapped onto the output plane with an imaging lens where the transform information is displayed. To obtain the cosine and sine transformations simultaneously a split grating as described before is used as the tilted fourth grating.

To perform filtering operations, spatial filters can be placed at the spatial frequency plane and a second optical processor can be used to perform the inverse transforms to convert back to the image domain. To increase the light level for the second stage, a light intensifier may be used at the output plane of the first processor.

BRIEF DESCRIPTION OF DRAWINGS

Those skilled in the art will come to appreciate the full range of advantages of the present invention by reading the following specification and by reference to the drawings in which.

DESCRIPTION OF THE PREFERRED EMBODIMENTS

Figure 1B:
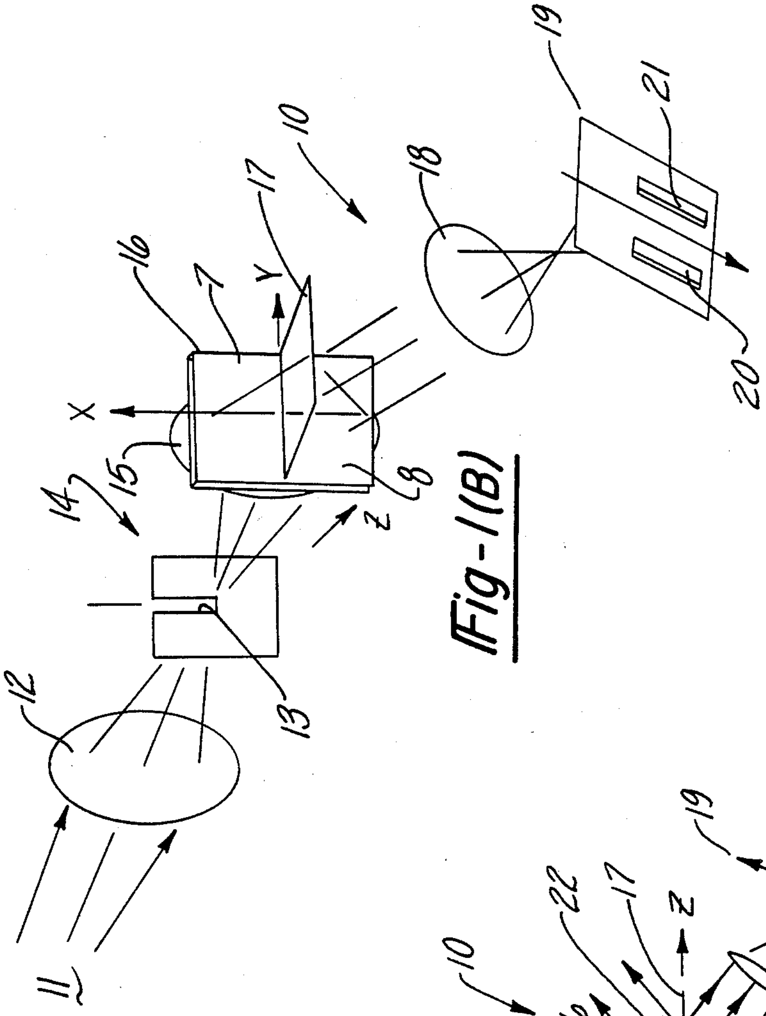
FIGS. 1A and 1B are schematic illustrations of an incoherent optical signal processor made in accordance with the present invention.
Figure 1A:
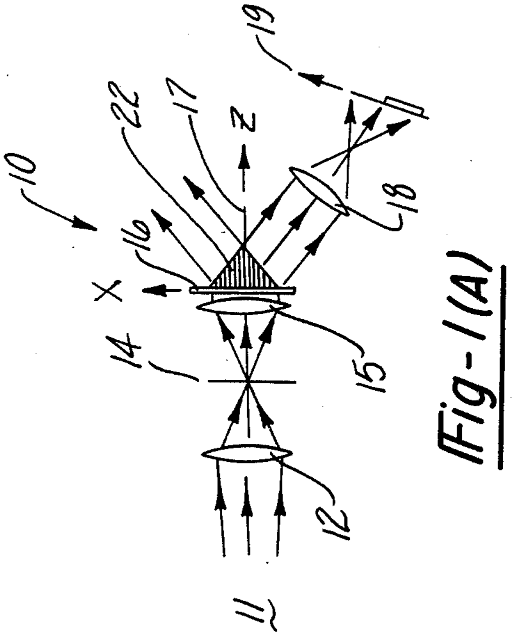

Turning to the embodiment of FIG. 1, the optical processor 10 employs a lens 15 to collimate the light emanated from an incoherent line source 14. By way of a nonlimiting example, the line source in this embodiment is obtained by imaging the object scene 11 with an imaging lens 12 onto a slit 13. The line source 14 can also take many other forms. To process temporal signals such as those derived from radar systems, the line source 14 can be a light emitting diode (LED) array, a scanning laser beam or a cathode ray tube which converts the temporal signal into a spatial format. The grating 16 is disposed downstream from the collimating lens 15 lying along the X, Y plane. The grating 16 has fringe pattern running parallel to the Y axis. A typical example of the grating spatial frequency is about 500 line pairs per millimeter. The grating 16 can be formed by holographic or ruling techniques.

The fringe pattern in the grating 16 operates to diffract the incoming light into two symmetric but opposite directions corresponding to the plus-minus first diffraction orders. The two beams interfere within a zone or a fringe box 22. The intensity distribution along the Z axis within the fringe box at X =O is the cosine transform (corresponding to the real part of the Fourier transform), together with a DC bias of the input light intensity distribution of the incoherent line source 14. This transform data is transferred to the output plane 19 by placing a pellicle beam splitter 17 with a 50—50 transmission - reflection ratio inside the fringe box 22 along the Y - Z plane at X=O.

The light field along the beam splitter 17 is mapped onto the output plane 19 with an imaging lens 18. The cosine transform data is displayed along the output plane 19.

To obtain the sine transform output (corresponding to the imaginary part of the Fourier transform), the grating 16 is translated by one eighth of a fringe to produce + or − $\pi/4$ phase shifts on the two symmetric beams. To obtain simultaneous cosine and sine transformations, the grating 16 can be a split grating where the two halves 7 and 8 have the same spatial frequency but with a 90 degree or $\pi/2$ phase shift between them.

To retrieve the transform information, a pair of photodetector arrays 20 and 21 are used to detect the intensity distribution at the output plane.

Figure 2:
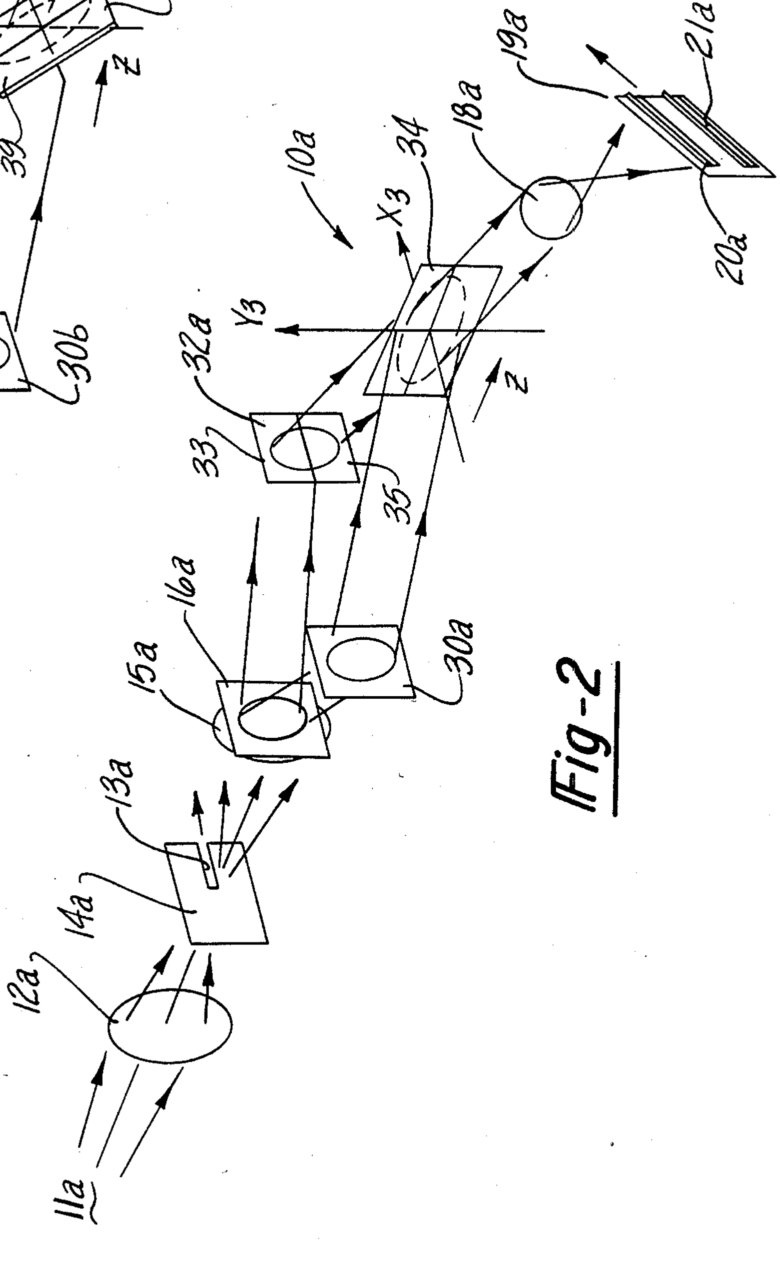
FIG. 2 is a schematic illustration of an alternate configuration of the incoherent optical signal processor.

FIG. 2 shows an alternate arrangement for the incoherent optical processor. The fringe box obtained with this configuration is located away from the gratings, thereby making it easier to place the beam splitter inside the fringe box. To a large extent the processor of FIG. 2 utilizes the same components as the processor of FIG. 1. Therefore, common components will bear the same reference numeral, with those in FIG. 2 including an "a" designation.

This configuration utilizes three gratings. The first grating **16*a* is disposed immediately behind the collimating lens 15*a* at the X, Y, plane. The grating 16*a* diffracts the incoming light into two symmetric beams corresponding to the plus-minus first diffraction orders. A pair of gratings 30 and 32 at plane $X_2,Y_2$ have spatial frequencies that are twice that of the first grating 16*a*. As a consequence, the light diffracted by gratings 30 and 32 is recombined near the plane $X_3,Y_3$ in a three dimensional interference or fringe box. The intensity distribution along the Z axis at $X_3=0$ is the cosine transform, together with a DC bias of the input intensity distribution of the input light source 14*a*.**

A pellicle beam splitter 34 is placed along the $Y_3$, Z plane at $X_3=0$ transversing the fringe box and an imaging lens **18*a* is used to map the intensity distribution along the beam splitter 34 to the output plane 19*a*. A photodetector array can be used to read out the light intensity distribution to obtain the transform information. To obtain simultaneously the cosine and sine transformation, grating 32 is split into two parts 33, 35 a described earlier in connection with grating 16 of the embodiment of FIG. 1. The cosine and sine transform outputs are read by two parallel photodetector arrays 20*a* and 21*a*.**

Figure 3:
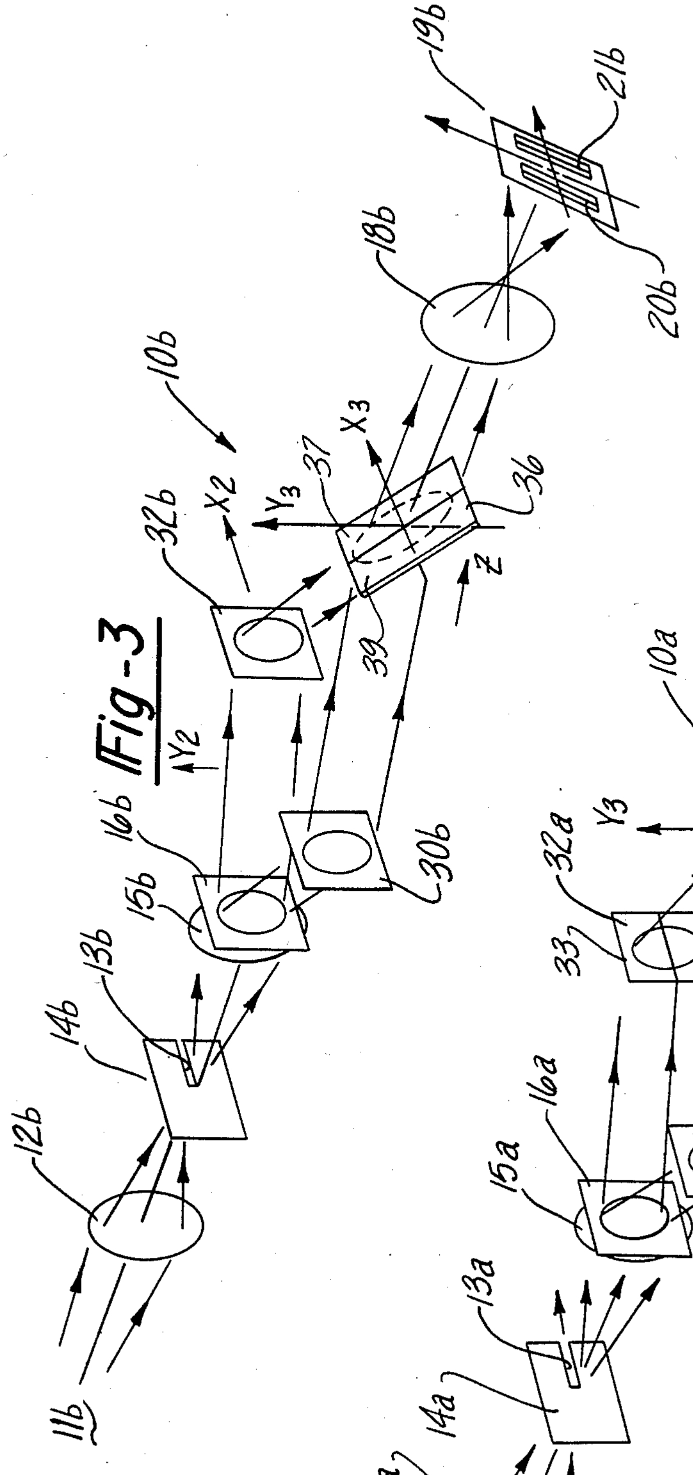
FIG. 3 is a schematic illustration of another alternate configuration of the incoherent optical processor.

FIG. 3 shows a third configuration for the incoherent optical processor and common components will include a "b" designation.

In this configuration a grating, instead of a pellicle beam splitter, is used to decode the transform data in the fringe box. As in FIG. 2, the first grating **16*b* diffracts the incoming light into two first order beams which are recombined by gratings 30*b* and 32*b*** (which is not split).

A fourth grating 36 is utilized to access the Fourier transformation along the Z axis. Grating 36 is used to translate this information to a more convenient plane for detection. Grating 36 employs fringe patterns having the same spatial frequency as grating **16*b* and run parallel to the Y, Z plane. Grating 36 is tilted so that it traverses the interference zone or fringe box. Consequently, different parts of grating 36 will be sampling the intensity at different points along the Z axis. The grating 36 diffracts both incident beams towards the output plane 19*b*. The intensity distribution along the fourth grating 36 which provides the cosine transform data together with a DC bias, is mapped into the output plane 19***b* with an imaging lens 18b. Once again photodetector arrays 20*b* and 21*b* are used to read the transform data. To obtain simultaneous cosine and sine transformations, grating 36 is split into two halves 37, 39 phase shifted 90 degrees from each other as described above.

It is noted that the fringe formation within the fringe box is achromatic. That is, the fringes formed by all the wavelength are in registration with each other. The input line source 14 can therefore be polychromatic. It is further noted that if a scanning point source (e.g. from the face plate of a CRT) is used to create the line source 14 (e.g. to process temporal input signals), then the detector arrays in the output plane 19 can integrate over all or part of the duration of a scan.

Figure 4:
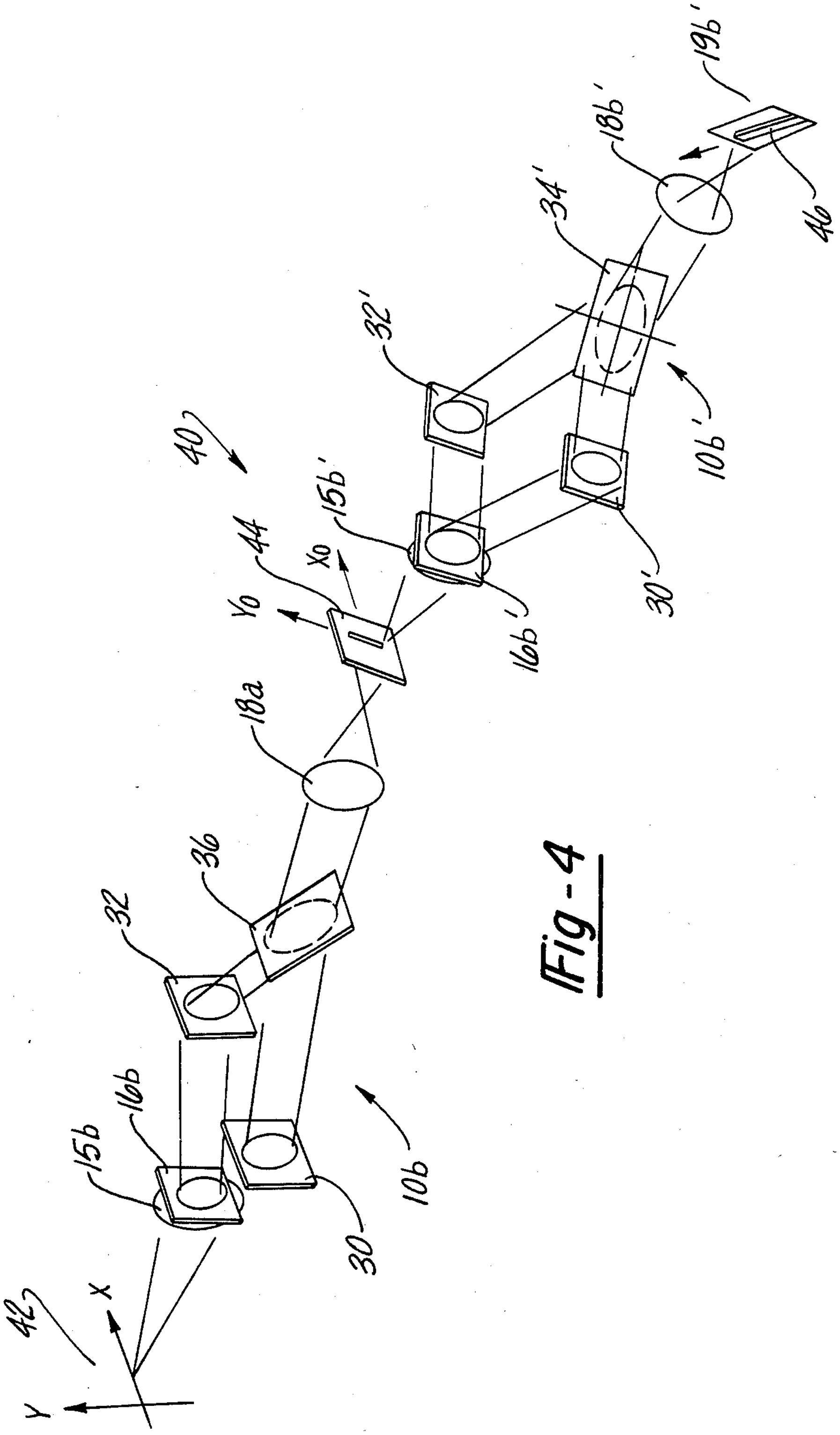
FIG. 4 is a schematic illustration of two incoherent optical processors operating in tandem to perform successive transformations for complex filtering operation.

FIG. 4 illustrates another use of the teachings of the present invention. The optical system 40 shown therein is used to reconstruct the input signal from source 42 by an inverse transform operation. Source 42 is illustrated in FIG. 4 as a scan line from a CRT. The construction of system 40 is useful for such things as performing complex filtering operations in real time. System 40 may be used, for example, to experiment with different spatial filters 44 for purposes of enhancing the image data from the input light source.

System 40 employs two optical processors each of which is quite similar to the optical processor described in connection with FIGS. 2 and 3. Hence, the same reference numerals will be used to identify common components, with the components of the second processor being labeled with prime superscripts.

Real time signal processing may be accomplished by placing an appropriate spatial filter 44 at the output plane $X_O'$-$Y_O'$ receiving the complex cosine and sine Fourier transform from the first processor 10*a* as described above. Since the transform operating is complex, complex filtering operations such as masked filtering can be performed with the system in real time. A light intensifier may be used at the plane of the spatial filter 44 to increase the light level available for the second stage. The processor 10*a'* is used to reconstruct the image from the source 14 by an inverse transform operation. The grating or beam splitter 34' traverses the interference zone of processor 10*b'* at a different angle so as to translate the intensity distribution therein to the output plane 19*b'* where it can be read by array 46.

From the foregoing those skilled in the art will appreciate that the present invention offers significant advantages over conventional Fourier transform techniques, the most important of which is the abaility to directly process information from an incoherent light source in real time. While this invention has been described in connection with particular examples thereof, no limitation is intended thereby except as defined in the following claims.

We claim:

1. An optical signal processor for performing real time Fourier transformations of an incoherent input line light source, said processor comprising:

lens means for collimating light from the line source;

first grating means lying in a given plane for diffracting the collimated light into two beams which interfere with each other and create an interference zone;

beam splitter means transversing the center of the interference zone lying in a plane perpendicular to the first grating means, operative to deflect the light incident thereon;

imaging lens means for mapping the light from the beam splitter means to an output plane; and transducer means in the output plane for converting the light to electrical signals.

2. The optical processor of claim 1 wherein said first grating means is split into two halves, one half having a fringe pattern that is phase shifted 90 degrees with respect to the other half; and wherein the transducer means in claim 1 comprises a pair of photodetector arrays for detecting the sine and cosine Fourier transformations of the light source.

3. An optical signal processor for performing real time Fourier transformations on the intensity distribution of an incoherent input line light source, said processor comprising:

lens means for collimating light radiated from the line source;

first grating means downstream from the lens and having a given spatial frequency, operative to split the light into two symmetric parts;

recombination grating means downstream from the first grating means including second and third gratings having twice the spatial frequencies as the first grating means, operative to recombine the light and cause the two parts to interfere at an interference zone;

beam splitting means in the interference zone, operative to deflect light incident thereon; and imaging lens means for mapping the light from the beam splitter means to an output plane where the Fourier transformation of the input light source can be read.

4. The optical processor of claim 3 wherein said second or third grating means is split into two halves, one half being phase shifted about 90 degrees with respect to the other half, whereby to provide both the sine and cosine parts of the Fourier transform at the output plane.

5. The optical processor of claim 3 wherein said beam splitting means comprises a fourth grating means split into two halves, one half being phase shifted about 90 degrees with respect to the other half whereby to provide both the sine and cosine parts of the Fourier transform at the output plane.

6. The optical processor of claims 4 or 5 which further includes:

a pair of photodetector arrays in the output plane for converting the light associated with the sine and cosine Fourier transforms to electrical signals, respectively.

7. An optical processing system for real time complex filtering, said system comprising:

a first optical processor having first collimating lens means for collimating light radiated from a source, first grating means for diffracting the collimated light into two beams and creating a first interference zone where the two beams interfere, first beam splitter means in the first interference zone for deflecting light incident thereon, first imaging lens means for mapping the light from the beam splitter to a first output plane;

a spatial filter in the first output plane;

a second optical processor having second collimating lens means for collimating light from the filter, second grating means for diffracting the light from the second lens into two beams and creating a second interference zone where the two beams interfere, second beam splitting means in the second interference zone for deflecting the light incident thereon, second imaging lens means for mapping the light from the beam splitter to a second output plane; and means in the second output plane for converting the light into electrical signals.

* * * * *